United States Patent
Sun et al.

(10) Patent No.: US 8,737,743 B2
(45) Date of Patent: May 27, 2014

(54) METHOD OF AND DEVICE FOR IDENTIFYING DIRECTION OF CHARACTERS IN IMAGE BLOCK

(75) Inventors: Jun Sun, Beijing (CN); Satoshi Naoi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 83 days.

(21) Appl. No.: 13/526,938

(22) Filed: Jun. 19, 2012

(65) Prior Publication Data
US 2013/0022272 A1    Jan. 24, 2013

(30) Foreign Application Priority Data
Jul. 20, 2011   (CN) .......................... 2011 1 0209832

(51) Int. Cl.
*G06K 9/18*       (2006.01)
(52) U.S. Cl.
USPC ............................................................ 382/182
(58) Field of Classification Search
None
See application file for complete search history.

(56) References Cited

U.S. PATENT DOCUMENTS

| | | | | |
|---|---|---|---|---|
| 5,508,810 A * | 4/1996 | Sato | .............................. | 358/296 |
| 6,148,119 A * | 11/2000 | Takaoka | ........................ | 382/289 |
| 6,360,028 B1 * | 3/2002 | Kaji et al. | ..................... | 382/296 |
| 6,804,414 B1 * | 10/2004 | Sakai et al. | ................... | 382/289 |
| 8,532,434 B2 * | 9/2013 | Morimoto | ..................... | 382/290 |
| 2004/0179733 A1 * | 9/2004 | Okubo | .......................... | 382/180 |
| 2009/0274392 A1 | 11/2009 | Fan et al. | | |

FOREIGN PATENT DOCUMENTS

| | | |
|---|---|---|
| CN | 101833648 | 9/2010 |
| JP | 8-212298 | 8/1996 |
| JP | 10-21336 | 1/1998 |
| JP | 2000-99628 | 4/2000 |
| JP | 2001-43310 | 2/2001 |

OTHER PUBLICATIONS

R. Unnikrishnan et al., Combined Script and Page Orientation Estimation using the Tesseract OCR engine, 2009.

\* cited by examiner

*Primary Examiner* — Daniel Mariam
(74) *Attorney, Agent, or Firm* — Staas & Halsey LLP

(57) ABSTRACT

The present embodiments disclose a method of and a device for identifying the direction of characters in an image block. The method includes: performing optical character recognition processing on the image block by assuming various directions as assumed character directions, respectively, to obtain sub image blocks, recognized characters corresponding to the sub image blocks and correctness measures thereof in each of the assumed character directions; determining a language group to which the characters in the image block belong; adjusting a correctness measure corresponding to a sub image block which corresponds to a recognized character not belonging to the determined language group in each of the assumed character directions; calculating an accumulative correctness measure in each of the assumed character directions based on the adjusted correctness measure; and identifying the direction of the characters in the image block according to the accumulative correctness measures.

14 Claims, 5 Drawing Sheets

OCR recognition result:

| Recognized character | U | P | A | H | O | V | N | ⌈ |
|---|---|---|---|---|---|---|---|---|
| Confidence | 0.54 | 0.36 | 0.48 | 0.61 | 0.62 | 0.61 | 0.58 | 0.65 |
| Serial number | P1 | P2 | P3 | P4 | P5 | P6 | P7 | P8 |

OCR recognition result:

| Recognized character | I | N | ⊤ | O | ʋ | | d | n |
|---|---|---|---|---|---|---|---|---|
| Confidence | 0.62 | 0.58 | 0.65 | 0.62 | 0.46 | | 0.50 | 0.61 |
| Candidate character | | | n | | W | | | |
| Confidence | | | 0.49 | | 0.39 | | | |
| Serial number | N1 | N2 | N3 | N4 | N5 | | N6 | N7 |

OCR recognition result:

| Recognized character | U | P |  | A | H | O | V | N | ⌈ |
|---|---|---|---|---|---|---|---|---|---|
| Recognition distance | 928 | 1279 |  | 1034 | 774 | 578 | 779 | 840 | 695 |
| Serial number | P1 | P2 |  | P3 | P4 | P5 | P6 | P7 | P8 |

OCR recognition result:

| Recognized character | I | N | ⊽ | O | ᴗ |  | d | n |
|---|---|---|---|---|---|---|---|---|
| Recognition distance | 759 | 840 | 704 | 769 | 1087 |  | 1005 | 790 |
| Candidate character |  |  |  | n | W |  |  |  |
| Recognition distance |  |  |  | 920 | 1230 |  |  |  |
| Serial number | N1 | N2 | N3 | N4 | N5 |  | N6 | N7 |

METHOD OF AND DEVICE FOR IDENTIFYING DIRECTION OF CHARACTERS IN IMAGE BLOCK

This application claims priority to Chinese Patent Application No. 201110209832.0, filed on Jul. 20, 2011 and entitled "Method of and Device for Identifying Direction of Characters in Image Block", contents of which are incorporated herein by reference in its entirety.

FIELD

The present embodiment generally relates to processing of a document image and, in particular, to a method of and device for identifying the direction of characters in an image block.

BACKGROUND

When a user scans a stack of documents using a scanner or the like, every page of each document is placed upside up for an ideal input. With the documents placed upside up, the user can read the documents easily, and scanned images of the documents can be read by the user without adjusting their directions. However in a practical application, the documents to be scanned by the user tend to be placed alternatively at angles of 0° (upside up) and 180° (upside down) as well as 90° and 270° (transversely). It would be burdensome and time-consuming for the user to check and adjust the placement directions of the documents page-by-page prior to their scanning. Therefore the scanner is designed with a function of judging automatically the direction of a document image. With the function of judging automatically the direction of a document image, the scanned document image can be adjusted to be placed upside up to thereby alleviate the burden on the user and improve the efficiency of usage by the user.

In a traditional method of judging automatically the direction of a document image, a text line in the document image is located; optical character recognition processing is performed respectively in four possible directions to obtain recognized characters and corresponding confidences or recognition distances thereof in the four possible directions; and the average confidence or the average recognition distance of the text line is calculated. The direction with the largest average confidence or the smallest average recognition distance is judged as the direction of the text line, and the direction of the document image is further judged from the direction of the text line. The direction of the text line refers to the upside-up direction of the text line, and the direction of the document image refers to the upside-up direction of the document image. Hereinafter, the character direction (or the direction of characters) refers to the upside-up direction of (the) characters.

SUMMARY

The following is the summary of the embodiments to facilitate a basic understanding of some aspects of the embodiments. However it shall be appreciated that this summary is not an extensive overview of the embodiments, and it is intended neither to identify certain crucial or important elements of the embodiments nor to delineate the scope of the embodiments. Rather, the primary purpose of the summary is to present some concepts of the embodiments in a simplified form prior to the more detailed description that is presented hereinafter.

As illustrated in FIG. 1, an image block of a text line "TIP AMOUNT" is input in the assumed 0° direction and is rotated by 180° to obtain an image block of the text line in the 180° direction. Since processes in the directions of 90° and 270° are similar to those in the directions of 0° and 180°, only the processes in the directions of 0° and 180° will be described here as an example. Optical character recognition processing is performed respectively on the image blocks of the text line in the directions of 0° and 180° to obtain sub image blocks, recognized characters corresponding to the sub image blocks and confidences thereof in the two directions as illustrated in FIG. 1.

In the traditional method, the average confidence of the recognized characters in the 0° direction equals to $(0.54+0.36+0.48+0.61+0.62+0.61+0.58+0.65)/8=0.55625$, and the average confidence of the recognized characters in the 180° direction equals to $(0.62+0.58+0.65+0.62+0.46+0.50+0.61)/7=0.5771$. Since 0.55625 is smaller than 0.5771, the 180° direction (i.e., the direction with the higher average confidence) might be judged in error as the direction of the characters in the image block of the text line in the traditional method.

One of the reasons for the foregoing error arising is because recognized characters generated from an optical character recognition engine supporting multiple languages may sometimes belong to different languages. This is easy to understand because a character belonging to a specific language is recognized easily as a character in the correct language when the character is placed upside-up but may not always be recognized as a character in the same language after the character is rotated by 90°, 180° and 270° but may instead appear similar to a character in another language.

The consistency in language has been disregarded in the prior art. The inventors of the embodiments have realized that a character rotated by a number of angles is recognized to thereby generate recognition results of optical character recognition in respective directions among which the probability that the character placed upside-up is judged in error by the optical character recognition engine as a character in another language is lowest and therefore respective recognized characters in that direction have a higher consistency in language. Thus, when optical character recognition processing is performed on the image block including characters by assuming various directions as assumed character directions respectively to obtain sub image blocks, recognized characters corresponding to the sub image blocks and correctness measures thereof in each of the assumed character directions, a language to which the characters in the image block belong can be determined in at least one of the directions, and a recognized character in recognition results in another language than the determined language is more likely to correspond to a character which is not placed upside-up.

The consistency in language has been disregarded in the traditional method for judging the direction of a text line from an average recognition confidence, thus the performance thereof is degraded to some extent.

An object of the embodiments is to address the foregoing problem by proposing a method of and device for identifying correctly the direction of characters in an image block. This solution can take the consistency in language into account and hereby adjust the correctness measure (confidence or recognition distance) corresponding to a sub image block to thereby improve the accuracy of judging automatically the direction of a document image.

In order to attain the foregoing object, there is provided according to an aspect of the embodiments a method of identifying the direction of characters in an image block, including: performing optical character recognition processing on the image block by assuming various directions as assumed character directions, respectively, to obtain sub image blocks, recognized characters corresponding to the sub image blocks and correctness measures thereof in each of the assumed character directions; determining a language group which the characters in the image block belong to; adjusting a correctness measure corresponding to a sub image block which corresponds to a recognized character not belonging to the determined language group in each of the assumed character directions; calculating an accumulative correctness measure in each of the assumed character directions based on the adjusted correctness measure; and identifying the direction of the characters in the image block according to the accumulative correctness measures.

According to an embodiment, the correctness measure includes a confidence and a recognition distance.

According to an embodiment, the adjusting a correctness measure corresponding to a sub image block which corresponds to a recognized character not belonging to the determined language group in each of the assumed character directions includes decreasing the confidence corresponding to the sub image block or increasing the recognition distance corresponding to the sub image block.

According to an embodiment, the adjusting a correctness measure corresponding to a sub image block which corresponds to a recognized character not belonging to the determined language group in each of the assumed character directions includes adjusting the confidence or the recognition distance corresponding to the sub image block to the maximum confidence among confidences corresponding to all of the candidate characters that belong to the determined language group in the assumed character direction and correspond to the sub image block or a minimum recognition distance among recognition distances corresponding to all of the candidate characters that belong to the determined language group in the assumed character direction and correspond to the sub image block, and, when none of the candidate characters in the assumed character direction which correspond to the sub image block belong to the determined language group, taking the minimum confidence among confidences corresponding to all of the candidate characters in the assumed character direction which correspond to the sub image block or the maximum recognition distance among recognition distances corresponding to all of the candidate characters in the assumed character direction which correspond to the sub image block as the confidence or the recognition distance corresponding to the sub image block.

According to an embodiment, the determining a language group to which the characters in the image block belong includes: in each of the assumed character directions, calculating the proportion of sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold, determining the language group as the language group to which the characters in the image block belong.

According to an embodiment, the determining a language group to which the characters in the image block belong includes: in each of the assumed character directions, calculating the proportion of the sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold and the proportion of sub image blocks corresponding to recognized characters which belong to a core character set of the language group in all of the sub image blocks in the assumed character direction is larger than a second threshold, determining the language group as the language group to which the characters in the image block belong.

According to an embodiment, the language group includes a Latin language group; the Latin language group includes Latin letters, Arabic numerals and non-character symbols; and a value range of the first threshold is (0.65, 0.85).

According to an embodiment, the language group includes a Korean language group and a Chinese/Japanese language group; the Korean language group includes Korean letters, Latin letters, Arabic numerals and non-character symbols, and a core character set of the Korean language group includes Korean letters; the Chinese/Japanese language group includes simplified Chinese characters, traditional Chinese characters, Chinese characters in Japanese, Japanese hiragana, Japanese katakana, Latin letters, Arabic numerals and non-character symbols, and a core character set of the Chinese/Japanese language group includes simplified Chinese characters, traditional Chinese characters, Chinese characters in Japanese, Japanese hiragana and Japanese katakana; and a value range of the first threshold is (0.65, 0.85), and a value range of the second threshold is (0.45, 0.65).

According to another aspect of the embodiments, there is provided a device for identifying the direction of characters in an image block, including: an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions; a language group determination unit configured for determining a language group which the characters in the image block belong to; a sub image block adjusting unit configured for adjusting a correctness measure corresponding to a sub image block which corresponds to a recognized character not belonging to the determined language group in each of the assumed character directions; an accumulative correctness measure calculating unit configured for calculating an accumulative correctness measure in each of the assumed character directions based on the adjusted correctness measure; and a character direction identifying unit configured for identifying the direction of the characters in the image block according to the accumulative correctness measures.

According to an embodiment, the sub image block adjusting unit is configured for decreasing the confidence corresponding to a sub image block which corresponds to a recognized character not belonging to the determined language group in each of the assumed character directions or increasing the recognition distance corresponding to the sub image block.

According to another aspect of the embodiments, there is provided a scanner including the above mentioned device for identifying the direction of characters in an image block.

Furthermore there is provided according to another aspect of the embodiments a storage medium including machine readable program codes which when being executed on an information processing device cause the information processing device to perform the foregoing method according to the embodiments.

Moreover there is provided according to a yet another aspect of the embodiments a program product including machine executable instructions which when being executed on an information processing device cause the information processing device to perform the foregoing method according to the embodiments.

BRIEF DESCRIPTION OF THE DRAWINGS

The foregoing and other objects, features and advantages of the embodiments will become more apparent from the detailed description of the embodiments thereof given below in conjunction with the accompanying drawings in which those components are merely intended to illustrate the principle of the embodiments and throughout which identical or like technical features or components are denoted with identical or like reference numerals. In the drawings.

DETAILED DESCRIPTION

Figure 1:
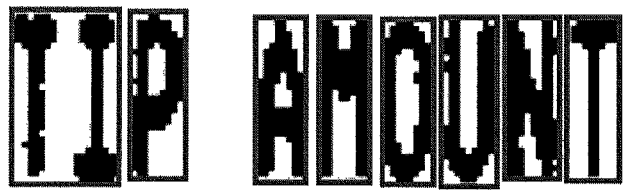
FIG. 1 illustrates sub image blocks, recognized characters and confidences thereof as well as candidate characters and confidences thereof in the directions of 0° and 180° resulting from optical character recognition processing of an image block of a text line.
Figure 1:
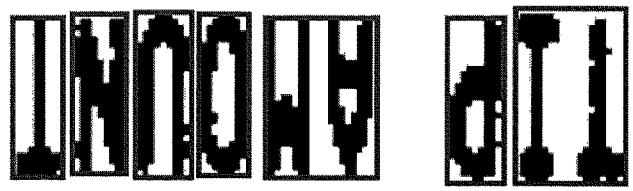

Exemplary embodiments will be detailed below in conjunction with the accompanying drawings. For the sake of clarity and conciseness, not all the features of practical implementations will be described in the specification. However it shall be appreciated that during developing any of such practical implementations, numerous implementation-specific decisions shall be made to achieve the developer's specific goals, for example, to comply with those system- and business-related constraining conditions which may vary from one implementation to another. Moreover it shall also be appreciated that such a development job might be very complex and time-consuming but may simply be a routine task for those skilled in the art benefiting from this disclosure.

It shall further be noted that only those device structures and/or process steps closely relevant to the solutions of the embodiments will be illustrated in the drawings while other details less relevant to the embodiments are omitted so as not to obscure the embodiments due to those unnecessary details. Furthermore it shall further be noted that an element and a feature described in one of the drawings or implementations of the embodiments can be combined with an element and a feature illustrated in one or more other drawings or implementations.

As assumed in this context, a text line has been located in a document image, and an image block containing the text line has been cropped from the document image. The embodiments are focused not upon how to locate the text line in the document image but upon how to identify correctly the direction of characters in the image block containing the text line.

It is typical to generally consider four primary directions as assumed character directions, i.e., the direction of the image block itself (the 0° direction), the direction of the image block rotated by 180°, the direction of the image block rotated by 90° and the direction of the image block rotated by 270°, also referred to as two transverse directions and two longitudinal directions of the image block. The directions of 90° and 270° generally apply to possibly vertically written characters, e.g., of Chinese, Japanese, etc. Since a scenario with the directions of 0° and 180° is similar to a scenario with the directions of 90° and 270°, only the scenario with the directions of 0° and 180° will be described below by way of an example.

Figure 3:
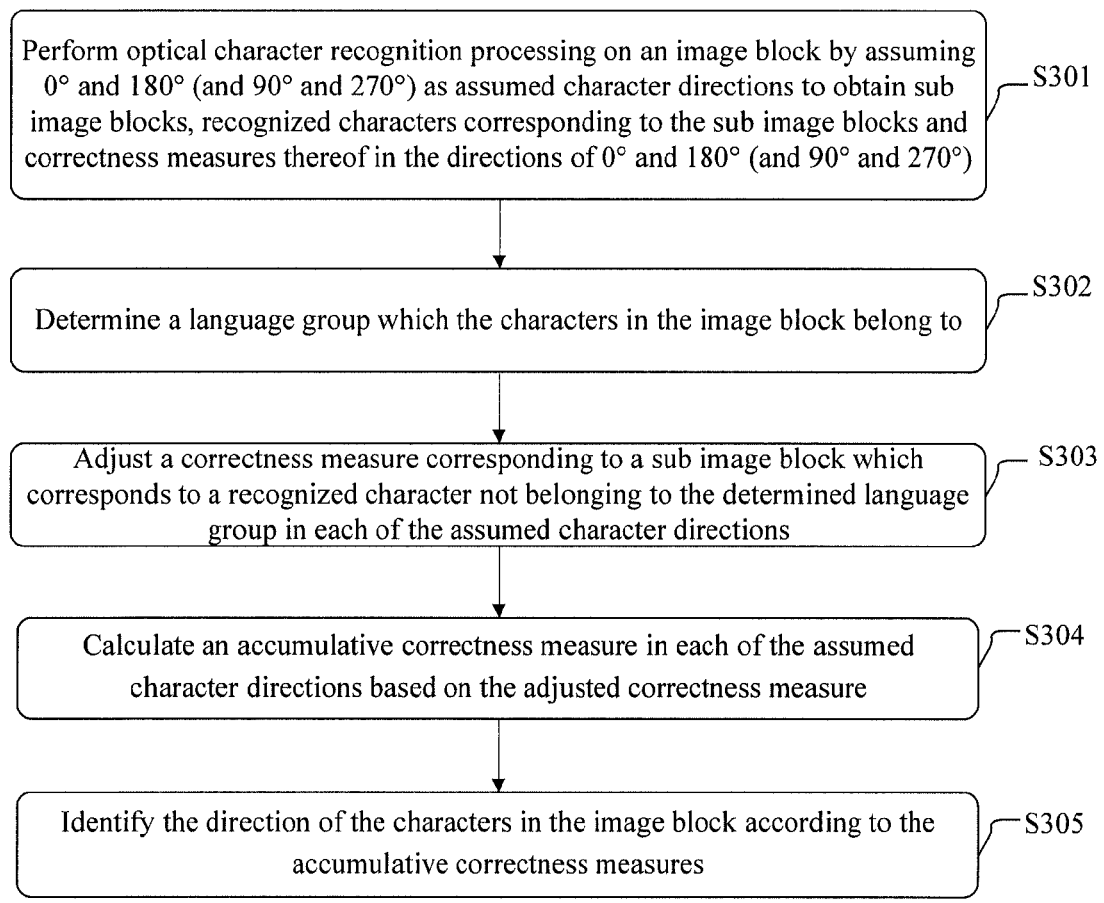
FIG. 3 illustrates a flow chart of a method of identifying the direction of characters in an image block according to an embodiment.

A flow of a method of identifying the direction of characters in an image block according to an embodiment will be described below with reference to FIG. 3.

Figure 2:
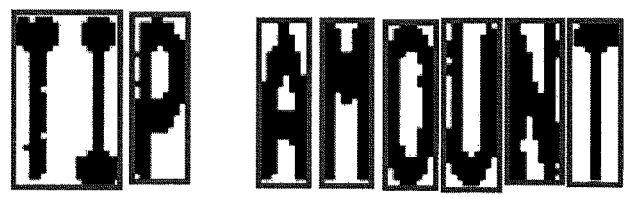
FIG. 2 illustrates sub image blocks, recognized characters and recognition distances thereof as well as candidate characters and recognition distances thereof in the directions of 0° and 180° resulting from optical character recognition processing of an image block of a text line.
Figure 2:
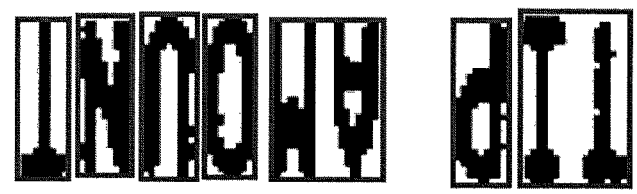

Firstly optical character recognition processing is performed on the image block by assuming 0° and 180° as assumed character directions to obtain sub image blocks, recognized characters corresponding to the sub image blocks and correctness measures thereof in the directions of 0° and 180° (at S301). FIG. 1 illustrates an example of sub image blocks which are numbered, recognized characters and confidences in the directions of 0° and 180°. FIG. 2 illustrates an example of sub image blocks which are numbered, recognized characters and recognition distances in the directions of 0° and 180°. A recognition result of optical character recognition generally includes divided-into sub image blocks, recognized characters corresponding to the sub image blocks and correctness measures of the recognized characters. A correctness measure reflects the reliability of a recognized character and is typically a confidence or a recognition distance. The higher the confidence is, the higher possibility that the recognized character is correct will be; and the shorter the recognition distance is, the higher possibility that the recognized character is correct will be.

Next a language group which the characters in the image block belong to is determined (at S302). As described above, one of reasons for an arising error is because the consistency in language has been disregarded. In real life, written characters typically include a large number of characters in a primary language and also a small number of pidgin characters in another language, Arabic numerals, non-character symbols, etc. For example, characters written in Chinese may be used in combination with other symbols of "good luck", "5782", "￥", "%", etc., than Chinese characters. Therefore the embodiments will not be limited to any specific language but can be used with the concept of a language group.

The language group includes a Latin language group, a Korean language group and a Chinese/Japanese language group.

The Latin language group includes Latin letters, Arabic numerals, non-character symbols, etc. The non-character symbols includes, for example, "￥", "%", "(",")", "&", etc.

The Korean language group includes Korean letters, Latin letters, Arabic numerals, non-character symbols, etc. Since Latin letters frequently occur in medical nouns, plant varieties, etc., and also are frequently used with another language, the non-Latin language groups include Latin letters, Arabic numerals, non-character symbols, etc.

However, the other language groups, such as the Korean language group, include all the contents of the Latin language group, so the other language groups shall be further characterized to be distinguished from the Latin language group in order to prevent the Latin language group from being judged in error as another language group. Therefore a core character set is further set for the other language groups. A core character set of a language group includes a set of characters distinguishing the language group from the Latin language group. For example, a core character set of the Korean language group includes Korean letters.

Similarly, the Chinese/Japanese language group includes simplified Chinese characters, traditional Chinese characters, Chinese characters in Japanese, Japanese hiragana, Japanese katakana, Latin letters, Arabic numerals and non-character symbols. A core character set of the Chinese/Japanese language group includes simplified Chinese characters, traditional Chinese characters, Chinese characters in Japanese, Japanese hiragana and Japanese katakana. A reason for such an arrangement is because characters written in Japanese frequently contain Chinese characters as a result of cultural propagation in history.

The Latin language group, the Korean language group and the Chinese/Japanese language group listed above are merely a few examples for a language group. Other designs for a language group can occur to those skilled in the art in light of the listed examples. For example, a Russian language group may include Russian letters, Latin letters, Arabic numerals, non-character symbols, etc.

The language group to which the characters in the image block belong can be determined in numerous ways. An illustrative method based upon a result of optical character recognition processing will be presented here, but the embodiments will not be limited thereto.

In each of the assumed character directions, the proportion of sub image blocks corresponding to recognized characters which belong to each of the language groups in all of the sub image blocks in the assumed character direction is calculated respectively. Under a determination condition for the Latin language group, when the proportion of sub image blocks corresponding to recognized characters which belong to the Latin language group in one of the assumed character directions in all of the sub image blocks in the assumed character direction is larger than a first threshold, the Latin language group is determined as the language group which the characters in the image block belong to. The first threshold for a language group can be determined from a statistical analysis of a corpus of linguistic materials that belong to the language group. The first threshold is relatively high because characters belonging to a language shall predominate among characters written in that language. The statistical analysis shows that the value range of the first threshold for the Latin language group is preferably (0.65, 0.85) and the more preferred value is 0.7. Under a determination condition for the Korean language group, when the proportion of sub image blocks corresponding to recognized characters which belong to the Korean language group in one of the assumed character directions in all of the sub image blocks in the assumed character direction is larger than a first threshold and the proportion of sub image blocks corresponding to recognized characters which belong to a core character set of the Korean language group in all of the sub image blocks in the assumed character direction is larger than a second threshold, the Korean language group is determined as the language group which the characters in the image block belong to. Also the second threshold for a language group can be determined from the statistical analysis of a corpus of linguistic materials that belong to the language group. Apparently the first threshold is higher than the second threshold. The statistical analysis shows that the value range of the first threshold for the Korean language group is preferably (0.65, 0.85) and the more preferred value is 0.7, and the value range of the second threshold is preferably (0.45, 0.65) and the more preferred value is 0.5.

A determination method for the Chinese/Japanese language group is similar to that for the Korean language group. Different first and second thresholds can be set for a different language group according to the result of a statistical analysis and based upon empirical and linguistic knowledge.

As described, it is determined in each of the assumed character directions whether the language group which the characters in the image block belong to is the Latin language group, the Korean language group or the Chinese/Japanese language group, etc. The language group which the characters in the image block belong to can be determined as long as one of the foregoing conditions is satisfied in one of the assumed character directions. All the elements of the Latin language group are introduced into the non-Latin language groups in order to comply with the real composition of characters. Also the non-Latin language groups can be distinguished effectively from the Latin language group due to the introduced concept of a core character set to thereby avoid such a situation that the determined language group which the characters in the image block belong to might vary from one assumed character direction to another.

For example, the recognized characters in the 0° direction are U, P, A, H, O, V, N and ⌈ in the example illustrated in FIG. 1. The first threshold is set to 0.7 and the second threshold is set to 0.5. Particularly the number of recognized characters belonging to the Latin language group is 8, and each of the recognized characters correspond to one sub image block; and the number of sub image blocks in that direction is 8, and 100% is above the first threshold 0.7, so the language group which the characters in the image block belong to is determined as the Latin language group. Similarly the language group to which the characters in the image block belong can also be determined in the 180° direction as the Latin language group. The Korea language group and the Chinese/Japanese language group are precluded because they fail to satisfy the condition for the second threshold although they satisfy the condition for the first threshold.

Next, a correctness measure corresponding to a sub image block which corresponds to a recognized character not belonging to the determined language group in each of the assumed character directions is adjusted at S303.

Particularly, the confidence corresponding to the sub image block is decreased or the recognition distance corresponding to the sub image block is increased. This is because a recognized character in another language group than the correctly determined language group is more likely to be an incorrect recognition result arising from rotation of a character placed upside-up. Thus, the confidence can be decreased or the recognition distance can be increased to thereby determine the direction of the characters in the image block more accurately based upon the correctness measures. Therefore, it can be appreciated that the confidence can be decreased or the recognition distance can be increased as long as this is done reasonably.

A specific implementation will be presented here. When the image block is divided and recognized with an optical character recognition engine, a plurality of sub image blocks are usually obtained, and a plurality of candidate characters with different correctness measures can be given for each of the sub image blocks and arranged in a descending order of confidences or an ascending order of recognition distances as illustrated at the bottoms of FIG. 1 and FIG. 2. Typically a candidate character with the highest confidence or the shortest recognition distance is presented as a recognized character.

However as described above, a recognized character in a specific assumed character direction, e.g., the recognized characters corresponding to the sub image blocks N3 and N5 in FIG. 1 and FIG. 2, etc., may not belong to the language group which the characters in the image block belong to, but a part of the candidate characters in the assumed character direction for N3 and N5 may belong to the language group which the characters in the image block belong to. Thus, the adjusted confidence or recognition distance corresponding to the sub image block can be set to the maximum confidence among confidences corresponding to all of the candidate characters that belong to the language group which the characters in the image block belong to in the assumed character direction and correspond to the sub image block or a minimum recognition distance among recognition distances corresponding to all of the candidate characters that belong to the language group which the characters in the image block belong to in the assumed character direction and correspond to the sub image block. Apparently, the adjusted confidence has been decreased or the adjusted recognition distance has been increased. In the case that none of the candidate characters in the assumed character direction, which correspond to the sub image block, belongs to the language group to which the characters in the image block belong, the adjusted confidence or recognition distance corresponding to the sub image block can be set to the minimum confidence among confidences corresponding to all of the candidate characters in the assumed character direction which correspond to the sub image block or the maximum recognition distance among recognition distances corresponding to all of the candidate characters in the assumed character direction which correspond to the sub image block.

For example, the recognized characters of N3 and N5 do not belong to the Latin language group determined at S302 in the examples illustrated in FIG. 1 and FIG. 2. Thus, the candidate characters corresponding to N3 are searched for the candidate character belonging to the Latin language group and with the highest confidence or the shortest recognition distance. FIG. 1 illustrates the candidate character "n" belonging to the Latin language group and with the highest confidence 0.49 among the candidate characters corresponding to N3 in that direction. Therefore 0.65 is replaced with 0.49 as the confidence corresponding to N3. Similarly the confidence corresponding to N5 is adjusted to 0.39. Alike the recognition distances corresponding to N3 and N5 are adjusted respectively to 920 and 1230 in FIG. 2.

Next, an accumulative correctness measure in each of the assumed character directions is calculated based on the adjusted correctness measure at S304, and the direction of the characters in the image block is identified according to the accumulative correctness measures at S305.

An accumulative correctness measure includes an accumulative confidence and an accumulative recognition distance. An accumulative confidence is a correctness measure characterizing an identification result of the image block of the text line in a direction as a whole. Typically the sum of confidences corresponding to all the sub image blocks in an assumed character direction can be taken as an accumulative confidence in that direction. Alternatively the arithmetic average of confidences corresponding to all the sub image blocks in an assumed character direction can be taken as an accumulative confidence in that direction. A direction with a higher accumulative confidence is more likely to be a correct identification result. The average confidence is more reliable because the number of sub image blocks may vary from one direction to another.

An accumulative recognition distance is also a correctness measure characterizing an identification result of the image block of the text line in a direction as a whole. Alike the sum of recognition distances corresponding to all the sub image blocks in an assumed character direction can be taken as an accumulative confidence in that direction. Alternatively the arithmetic average of recognition distances corresponding to all the sub image blocks in an assumed character direction can be taken as an accumulative recognition distance in that direction. A direction with a shorter accumulative recognition distance is more likely to be a correct identification result. The average recognition distance is more reliable because the number of sub image blocks may vary from one direction to another.

In the example of FIG. 1, after S301 to S303 are performed,
Accumulative confidence in the 0° direction=(0.54+0.36+0.48+0.61+0.62+0.61+0.58+0.65)/8=0.55625
Accumulative confidence in the 180° direction=(0.62+0.58+0.49+0.62+0.39+0.50+0.61)/7=0.5442
In the example of FIG. 2, after S301 to S303 are performed,
Accumulative recognition distance in the 0° direction=(928+1279+1034+774+578+779+840+695)/8=863.375
Accumulative recognition distance in the 180° direction (759+840+920+769+1230+1005+790)/7=901.857

Apparently the accumulative confidence in the 0° direction is higher than the accumulative confidence in the 180° direction or the accumulative recognition distance in the 0° direction is shorter than the accumulative recognition distance in the 180° direction after the confidences or the recognition distances are adjusted as above, thereby giving a more accurate determination result.

Figure 4:
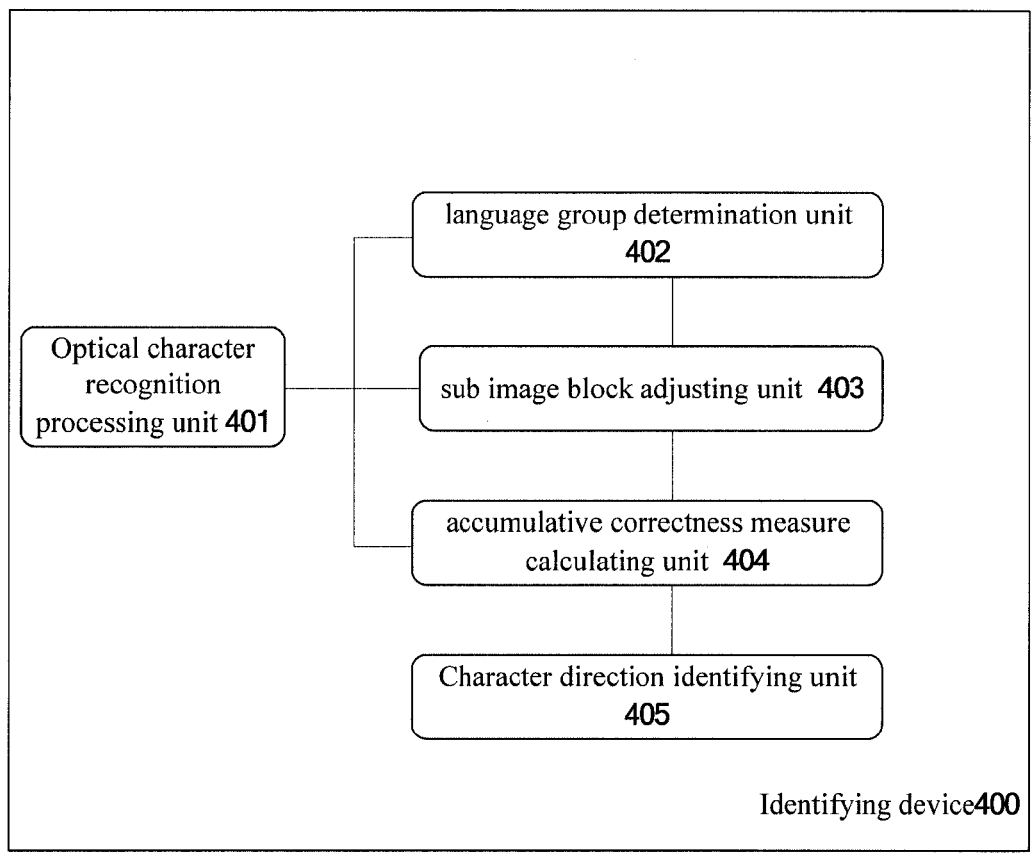
FIG. 4 illustrates a structural block diagram of an identifying device for identifying the direction of characters in an image block according to an embodiment.

A structure of an identifying device for identifying the direction of characters in an image block according to an embodiment will be described below with reference to FIG. 4. As illustrated in FIG. 4, the identifying device 400 for identifying the direction of characters in an image block according to the embodiment includes: an optical character recognition processing unit 401 configured for performing optical character recognition processing on the image block by assuming various directions as assumed character directions, respectively, to obtain sub image blocks, recognized characters corresponding to the sub image blocks and correctness measures thereof in each of the assumed character directions; a language group determination unit 402 configured for determining a language group to which the characters in the image block belong; a sub image block adjusting unit 403 configured for adjusting a correctness measure corresponding to a sub image block which corresponds to a recognized character not belonging to the determined language group in each of the assumed character directions; an accumulative correctness measure calculating unit 404 configured for calculating an accumulative correctness measure in each of the assumed character directions based on the adjusted correctness measure; and a character direction identifying unit 405 configured for identifying the direction of the characters in the image block according to the accumulative correctness measures.

Since processing in the optical character recognition processing unit 401, the language group determination unit 402, the sub image block adjusting unit 403, the accumulative correctness measure calculating unit 404 and the character direction identifying unit 405 included in the identifying device 400 according to the embodiments is similar respectively to processing at S301-S305 of the method for identifying the direction of characters in an image block described above, a detailed description of these units will be omitted here for the sake of conciseness.

Furthermore it shall be noted here that the respective constituent modules and units in the foregoing device can be configured in software, firmware, hardware or a combination thereof. Specific configuration means or approaches available are well known to those skilled in the art, and a repeated description thereof will be omitted here. In the case of being implemented in software or firmware, a program constituting the software is installed from a storage medium or a network to a computer with a dedicated hardware structure (e.g., a general-purpose computer 500 illustrated in FIG. 5, etc.), which can perform various functions when various programs are installed thereon.

Figure 5:
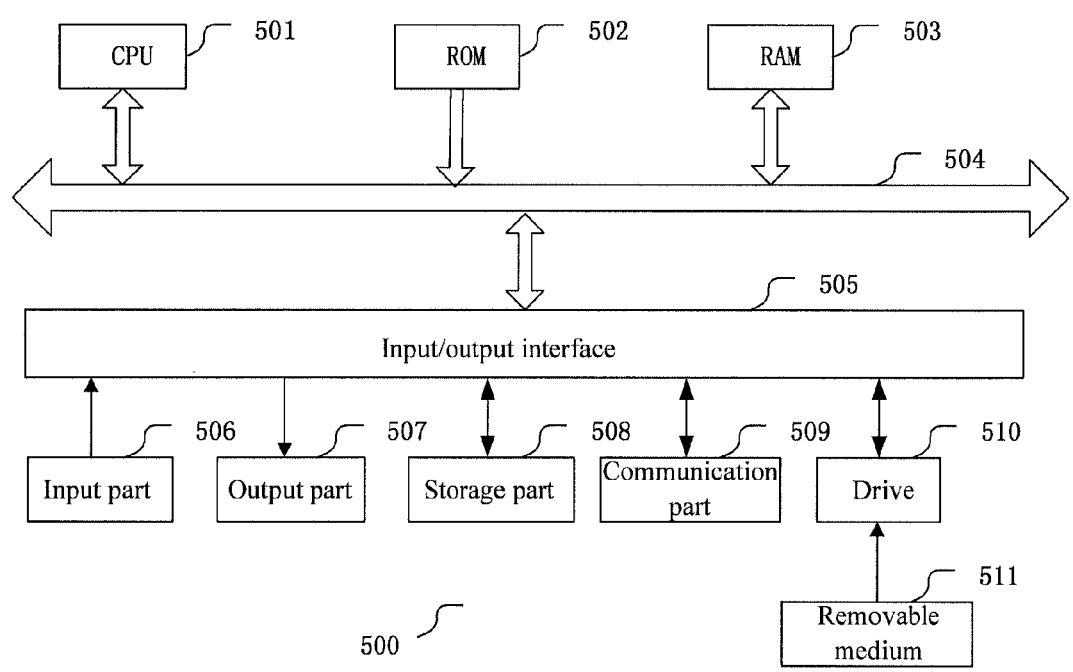
FIG. 5 illustrates a schematic block diagram of a computer that can be used for implementing the method and device according to the embodiments.

In FIG. 5, a Central Processing Unit (CPU) 501 performs various processes according to a program stored in a Read Only Memory (ROM) 502 or loaded from a storage part 508 into a Random Access Memory (RAM) 503 in which data required when the CPU 501 performs the various processes is also stored as needed. The CPU 501, the ROM 502 and the RAM 503 are connected to each other via a bus 504 to which an input/output interface 505 is also connected.

The following components are connected to the input/output interface 505: an input part 506 (including a keyboard, a mouse, etc.); an output part 507 (including a display, e.g., a Cathode Ray Tube (CRT), a Liquid Crystal Display (LCD), etc., a speaker, etc.), a storage part 508 (including a hard disk, etc.) and a communication part 509 (including a network interface card, e.g., an LAN card, a modem, etc.). The communication part 509 performs a communication process over a network, e.g., the Internet. A drive 510 is also connected to the input/output interface 505 as needed. A removable medium 511, e.g., a magnetic disk, an optical disk, an optic-magnetic disk, a semiconductor memory, etc., can be installed on the drive 510 as needed so that a computer program fetched therefrom can be installed into the storage part 508 as needed.

In the case that the foregoing series of processes are performed in software, a program constituting the software is installed from the network, e.g., the Internet, etc., or a storage medium, e.g., the removable non-transitory medium 511, etc.

Those skilled in the art shall appreciate that such a storage medium will not be limited to the removable medium 511 illustrated in FIG. 5 in which the program is stored and which is distributed separately from the device to provide a user with the program. Examples of the removable medium 511 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 502, the hard disk included in the storage part 508, etc., in which the program is stored and which is distributed together with the device including the same to the user.

The embodiments further propose a program product including machine readable instruction codes stored thereon which can perform the foregoing method according to the embodiment when being read and executed by a machine.

Correspondingly a storage medium on which the program product including the machine readable instruction codes stored thereon is embodied will also be encompassed in the disclosure. The storage medium includes but will not be limited to a floppy disk, an optical disk, an optic-magnetic disk, a memory card, a memory stick, etc.

The identifying device for identifying the direction of characters in an image block, the identifying method of identifying the direction of characters in an image block and the corresponding program product, which are disclosed in the embodiments, can be applicable to a scanner or other image scanning devices to identify the direction of characters in a scanned document.

In the foregoing description of the embodiments, a feature described and/or illustrated in connection with an embodiment can be used identically or similarly in one or more other embodiments in combination with or in place of a feature in the other embodiment(s).

It shall be emphasized that the terms "include/comprise" and their variants as used in this context refer to presence of a feature, an element, a step or a component but do not preclude presence or addition of one or more other features, elements, steps or components.

Furthermore the method according to the embodiments will not be limited to being performed in the temporal sequence described in the specification but can alternatively be performed in another temporal sequence, concurrently or separately. Therefore the sequence in which the method is performed as described in the specification will not limit the technical scope of the embodiments.

Although the embodiments have been disclosed above in the description of the embodiments thereof, it shall be appreciated that all the embodiments and examples described above are illustrative but not limiting. Those skilled in the art can devise various modifications, adaptations or equivalents to the embodiments without departing from the spirit and scope of the appended claims. These modifications, adaptations or equivalents shall also be construed as coming into the scope of the embodiments.

Annexes

Annex 1. A method of identifying the direction of characters in an image block, including:

performing optical character recognition processing on the image block by assuming various directions as assumed character directions, respectively, to obtain sub image blocks, recognized characters corresponding to the sub image blocks and correctness measures thereof in each of the assumed character directions;

determining a language group which the characters in the image block belong to;

adjusting a correctness measure corresponding to a sub image block which corresponds to a recognized character not belonging to the determined language group in each of the assumed character directions;

calculating an accumulative correctness measure in each of the assumed character directions based on the adjusted correctness measure; and identifying the direction of the characters in the image block according to the accumulative correctness measures.

Annex 2. The method according to annex 1, wherein:

said correctness measure includes a confidence and a recognition distance; and said adjusting a correctness measure corresponding to a sub image block which corresponds to a recognized character not belonging to the determined language group in each of the assumed character directions includes decreasing the confidence corresponding to the sub image block or increasing the recognition distance corresponding to the sub image block.

Annex 3. The method according to annex 1, wherein:

said correctness measure includes a confidence and a recognition distance; and said adjusting a correctness measure corresponding to a sub image block which corresponds to a recognized character not belonging to the determined language group in each of the assumed character directions includes adjusting the confidence or the recognition distance corresponding to the sub image block to the maximum confidence among confidences corresponding to all of the candidate characters that belong to the determined language group in the assumed character direction and correspond to the sub image block or a minimum recognition distance among recognition distances corresponding to all of the candidate characters that belong to the determined language group in the assumed character direction and correspond to the sub image block, and, when none of the candidate characters in the assumed character direction which correspond to the sub image block belong to the determined language group, taking the minimum confidence among confidences corresponding to all of the candidate characters in the assumed character direction which correspond to the sub image block or the maximum recognition distance among recognition distances corresponding to all of the candidate characters in the assumed character direction which correspond to the sub image block as the confidence or the recognition distance corresponding to the sub image block.

Annex 4. The method according to annex 1, wherein said determining a language group which the characters in the image block belong to includes:

in each of the assumed character directions, calculating the proportion of sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold, determining the language group as the language group which the characters in the image block belong to.

Annex 5. The method according to annex 1, wherein said determining a language group which the characters in the image block belong to includes:

in each of the assumed character directions, calculating the proportion of the sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold and the proportion of sub image blocks corresponding to recognized characters which belong to a core character set of the language group in all of the sub image blocks in the assumed character direction is larger than a second threshold, determining the language group as the language group which the characters in the image block belong to.

Annex 6. The method according to annex 4, wherein the language group includes a Latin language group;

the Latin language group includes Latin letters, Arabic numerals and non-character symbols; and a value range of the first threshold is (0.65, 0.85).

Annex 7. The method according to annex 5, wherein the language group includes a Korean language group and a Chinese/Japanese language group;

the Korean language group includes Korean letters, Latin letters, Arabic numerals and non-character symbols, and a core character set of the Korean language group includes Korean letters;

the Chinese/Japanese language group includes simplified Chinese characters, traditional Chinese characters, Chinese characters in Japanese, Japanese hiragana, Japanese katakana, Latin letters, Arabic numerals and non-character symbols, and a core character set of the Chinese/Japanese language group includes simplified Chinese characters, traditional Chinese characters, Chinese characters in Japanese, Japanese hiragana and Japanese katakana; and a value range of the first threshold is (0.65, 0.85), and a value range of the second threshold is (0.45, 0.65).

Annex 8. The method according to any one of annexes 1-7, wherein the various directions include two transverse directions and two longitudinal directions of the image block.

Annex 9. A device for identifying the direction of characters in an image block, including:

an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions;

a language group determination unit configured for determining a language group which the characters in the image block belong to;

a sub image block adjusting unit configured for adjusting a correctness measure corresponding to a sub image block which corresponds to a recognized character not belonging to the determined language group in each of the assumed character directions;

an accumulative correctness measure calculating unit configured for calculating an accumulative correctness measure in each of the assumed character directions based on the adjusted correctness measure; and a character direction identifying unit configured for identifying the direction of the characters in the image block according to the accumulative correctness measures.

Annex 10. The device according to annex 9, wherein the sub image block adjusting unit is configured for decreasing the confidence corresponding to a sub image block which corresponds to a recognized character not belonging to the determined language group in each of the assumed character directions or increasing the recognition distance corresponding to the sub image block.

Annex 11. The device according to annex 9, wherein the sub image block adjusting unit is configured for adjusting the confidence or the recognition distance corresponding to a sub image block which corresponds to a recognized character not belonging to the determined language group in each of the assumed character directions to the maximum confidence among confidences corresponding to all of the candidate characters that belong to the determined language group in the assumed character direction and correspond to the sub image block or a minimum recognition distance among recognition distances corresponding to all of the candidate characters that belong to the determined language group in the assumed character direction and correspond to the sub image block, and, when none of the candidate characters in the assumed character direction which correspond to the sub image block belong to the determined language group, taking the minimum confidence among confidences corresponding to all of the candidate characters in the assumed character direction which correspond to the sub image block or the maximum recognition distance among recognition distances corresponding to all of the candidate characters in the assumed character direction which correspond to the sub image block as the confidence or the recognition distance corresponding to the sub image block.

Annex 12. The device according to annex 9, wherein the language group determination unit is configured for in each of the assumed character directions, calculating the proportion of sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold, determining the language group as the language group which the characters in the image block belong to.

Annex 13. The device according to annex 9, wherein the language group determination unit is configured for in each of the assumed character directions, calculating the proportion of the sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold and the proportion of sub image blocks corresponding to recognized characters which belong to a core character set of the language group in all of the sub image blocks in the assumed character direction is larger than a second threshold, determining the language group as the language group which the characters in the image block belong to.

Annex 14. A scanner including the device for identifying the direction of characters in an image block according to any one of annexes 9-13.

The invention claimed is:

1. A method of identifying the direction of characters in an image block, comprising:
  performing optical character recognition processing on the image block by assuming various directions as assumed character directions, respectively, to obtain sub image blocks, recognized characters corresponding to the sub image blocks and correctness measures thereof in each of the assumed character directions;
  determining a language group to which the characters in the image block belong;
  adjusting a correctness measure corresponding to a sub image block which corresponds to a recognized character not belonging to the determined language group in each of the assumed character directions;
  calculating an accumulative correctness measure in each of the assumed character directions based on the adjusted correctness measure; and
  identifying the direction of the characters in the image block according to the accumulative correctness measures.

2. The method according to claim 1, wherein:
  said correctness measure comprises a confidence and a recognition distance; and
  said adjusting a correctness measure corresponding to a sub image block which corresponds to a recognized character not belonging to the determined language group in each of the assumed character directions comprises one of decreasing the confidence corresponding to the sub image block and increasing the recognition distance corresponding to the sub image block.

3. The method according to claim 1, wherein:
  said correctness measure comprises a confidence and a recognition distance; and
  said adjusting a correctness measure corresponding to a sub image block which corresponds to a recognized character not belonging to the determined language group in each of the assumed character directions comprises adjusting one of the confidence and the recognition distance corresponding to the sub image block to one of the maximum confidence among confidences corresponding to all of the candidate characters that belong to the determined language group in the assumed character direction and correspond to the sub image block and a minimum recognition distance among recognition distances corresponding to all of the candidate characters that belong to the determined language group in the assumed character direction and correspond to the sub image block, and, when none of the candidate characters in the assumed character direction which correspond to the sub image block belong to the determined language group, taking one of the minimum confidence among confidences corresponding to all of the candidate characters in the assumed character direction which correspond to the sub image block and the maximum recognition distance among recognition distances corresponding to all of the candidate characters in the assumed character direction which correspond to the sub image block as one of the confidence and the recognition distance corresponding to the sub image block.

4. The method according to claim 1, wherein said determining a language group to which the characters in the image block belong comprises:
  in each of the assumed character directions, calculating a proportion of sub image blocks corresponding to recognized characters which belong to each of the language groups in all of the sub image blocks in the assumed character direction, respectively; and
  when the proportion of sub image blocks corresponding to recognized characters which belong to a certain language group in all of the sub image blocks in the assumed character direction is larger than a first threshold, determining the language group as the language group to which the characters in the image block belong.

5. The method according to claim 1, wherein said determining a language group to which the characters in the image block belong comprises:
  in each of the assumed character directions, calculating a proportion of the sub image blocks corresponding to recognized characters which belong to each of the language groups in all of the sub image blocks in the assumed character direction, respectively; and
  when the proportion of sub image blocks corresponding to recognized characters which belong to a certain language group in all of the sub image blocks in the assumed character direction is larger than a first threshold and the proportion of sub image blocks corresponding to recognized characters which belong to a core character set of the language group in all of the sub image blocks in the assumed character direction is larger than a second threshold, determining the language group as the language group to which the characters in the image block belong.

6. The method according to claim 4, wherein the language group comprises a Latin language group;
  the Latin language group comprises Latin letters, Arabic numerals and non-character symbols; and
  a value range of the first threshold is (0.65, 0.85).

7. The method according to claim 5, wherein the language group comprises a Korean language group and a Chinese/Japanese language group;
  the Korean language group comprises Korean letters, Latin letters, Arabic numerals and non-character symbols, and a core character set of the Korean language group comprises Korean letters;
  the Chinese/Japanese language group comprises simplified Chinese characters, traditional Chinese characters, Chinese characters in Japanese, Japanese hiragana, Japanese katakana, Latin letters, Arabic numerals and non-character symbols, and a core character set of the Chinese/Japanese language group comprises simplified Chinese characters, traditional Chinese characters, Chinese characters in Japanese, Japanese hiragana and Japanese katakana; and a value range of the first threshold is (0.65, 0.85), and a value range of the second threshold is (0.45, 0.65).

8. The method according to claim 1, wherein the various directions comprise two transverse directions and two longitudinal directions of the image block.

9. A device for identifying the direction of characters in an image block, comprising:

an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions;

a language group determination unit configured for determining a language group to which the characters in the image block belong;

a sub image block adjusting unit configured for adjusting a correctness measure corresponding to a sub image block which corresponds to a recognized character not belonging to the determined language group in each of the assumed character directions;

an accumulative correctness measure calculating unit configured for calculating an accumulative correctness measure in each of the assumed character directions based on the adjusted correctness measure; and a character direction identifying unit configured for identifying the direction of the characters in the image block according to the accumulative correctness measures.

10. The device according to claim 9, wherein the sub image block adjusting unit is configured for one of decreasing the confidence corresponding to a sub image block which corresponds to a recognized character not belonging to the determined language group in each of the assumed character directions and increasing the recognition distance corresponding to the sub image block.

11. The device according to claim 9, wherein the sub image block adjusting unit is configured for adjusting one of the confidence and the recognition distance corresponding to a sub image block which corresponds to a recognized character not belonging to the determined language group in each of the assumed character directions to one of the maximum confidence among confidences corresponding to all of the candidate characters that belong to the determined language group in the assumed character direction and correspond to the sub image block and a minimum recognition distance among recognition distances corresponding to all of the candidate characters that belong to the determined language group in the assumed character direction and correspond to the sub image block, and, when none of the candidate characters in the assumed character direction which correspond to the sub image block belong to the determined language group, taking one of the minimum confidence among confidences corresponding to all of the candidate characters in the assumed character direction which correspond to the sub image block and the maximum recognition distance among recognition distances corresponding to all of the candidate characters in the assumed character direction which correspond to the sub image block as the one of confidence and the recognition distance corresponding to the sub image block.

12. The device according to claim 9, wherein the language group determination unit is configured for in each of the assumed character directions, calculating the proportion of sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold, determining the language group as the language group to which the characters in the image block belong.

13. The device according to claim 9, wherein the language group determination unit is configured for in each of the assumed character directions, calculating a proportion of the sub image blocks corresponding to recognized characters which belong to each of the language groups in all of the sub image blocks in the assumed character direction, respectively; and when the proportion of sub image blocks corresponding to recognized characters which belong to a certain language group in all of the sub image blocks in the assumed character direction is larger than a first threshold and the proportion of sub image blocks corresponding to recognized characters which belong to a core character set of the language group in all of the sub image blocks in the assumed character direction is larger than a second threshold, determining the language group as the language group to which the characters in the image block belong.

14. A scanner comprising the device for identifying the direction of characters in an image block according to claim 9.

* * * * *